(12) United States Patent
Reick et al.

(10) Patent No.: US 10,288,152 B2
(45) Date of Patent: May 14, 2019

(54) POWER-SPLIT DRIVELINE FOR A WORK MACHINE

(71) Applicant: ZF Friedrichshafen AG, Friedrichshafen (DE)

(72) Inventors: Benedikt Reick, Friedrichshafen (DE); Raphael Himmelsbach, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 102 days.

(21) Appl. No.: 15/480,532

(22) Filed: Apr. 6, 2017

(65) Prior Publication Data

US 2017/0299022 A1    Oct. 19, 2017

(30) Foreign Application Priority Data

Apr. 13, 2016    (DE) .................. 10 2016 206 205

(51) Int. Cl.
*B60K 17/356* (2006.01)
*F16H 3/72* (2006.01)

(52) U.S. Cl.
CPC ........... *F16H 3/728* (2013.01); *B60K 17/356* (2013.01); *F16H 2200/0056* (2013.01);
(Continued)

(58) Field of Classification Search
CPC ............ F16H 3/728; F16H 2200/2041; F16H 2200/2056; F16H 2200/2038;
(Continued)

(56) References Cited

U.S. PATENT DOCUMENTS

| 8,944,194 B2 | 2/2015 | Glaser et al. |
| 2005/0109549 A1* | 5/2005 | Morrow ................ B60K 6/365 180/65.245 |

(Continued)

FOREIGN PATENT DOCUMENTS

| DE | 1 945 439 | 3/1971 |
| DE | 10 2005 044 181 A1 | 4/2007 |

(Continued)

OTHER PUBLICATIONS

German Search Report Corresponding to 10 2016 206 204.2 dated Feb. 2, 2017.

(Continued)

*Primary Examiner* — Jeffrey A Shapiro
(74) *Attorney, Agent, or Firm* — Davis & Bujold PLLC; Michael J. Bujold

(57) ABSTRACT

A power-split drive train having a main drive, three output shafts (Ab1, Ab2, Ab3) and a continuously variable power-split transmission with three additional drive units. The transmission enables rotational speed variability at the shafts (Ab1, Ab2, Ab3). Furthermore, each drive unit (2a, 2b, 2c) has a respective energy converter (3a, 3b, 3c) which are all electrically connected. Drive unit (2a) has planetary gearset (4a) that is connected, via a first shaft (W1), to the main drive. Shaft (Ab1) is connected, via a second shaft (W2), to gearset (4a) and energy converter (3a) is connected, via a third shaft (W3), to gearset (4a). The drive unit (2a) is at least indirectly connected to drive unit (2b) which is connected by a fifth shaft (W5) to shaft (Ab2). Drive unit (2a) is at least indirectly connected to drive unit (2c) which is connected by a seventh shaft (W7) to shaft (Ab3).

8 Claims, 4 Drawing Sheets

(52) U.S. Cl.
CPC ................ *F16H 2200/0073* (2013.01); *F16H 2200/201* (2013.01); *F16H 2200/2005* (2013.01); *F16H 2200/2007* (2013.01); *F16H 2200/2038* (2013.01); *F16H 2200/2041* (2013.01)

(58) Field of Classification Search
CPC ..... F16H 2200/2005; F16H 2200/2007; F16H 2200/201; F16H 2200/0073; B60K 17/28; B60K 17/34; B60K 17/356
USPC ............................................................ 475/5
See application file for complete search history.

(56) References Cited

U.S. PATENT DOCUMENTS

| | | | | |
|---|---|---|---|---|
| 2010/0170732 | A1* | 7/2010 | Glaser ...................... | B60K 6/46 180/65.245 |
| 2011/0042155 | A1* | 2/2011 | Tarasinski .............. | B60K 6/365 180/65.6 |
| 2016/0153174 | A1* | 6/2016 | Naito ....................... | B60K 6/40 475/5 |

FOREIGN PATENT DOCUMENTS

| | | |
|---|---|---|
| DE | 10 2013 224 383 A1 | 5/2015 |
| FR | 2 658 259 A1 | 8/1991 |

OTHER PUBLICATIONS

German Search Report Corresponding to 10 2016 206 205.0 dated Feb. 2, 2017.

\* cited by examiner

| | K1 | K2 | K3 | B1 |
|---|---|---|---|---|
| S1 | | | X | |
| S2 | | X | X | |
| S3 | | | | X |
| S4 | | X | | X |
| S5 | | X | | |
| S6 | X | | X | |
| S7 | X | X | X | |
| S8 | X | | | X |
| S9 | X | X | | X |
| S10 | X | X | | |
| S11 | X | | | |

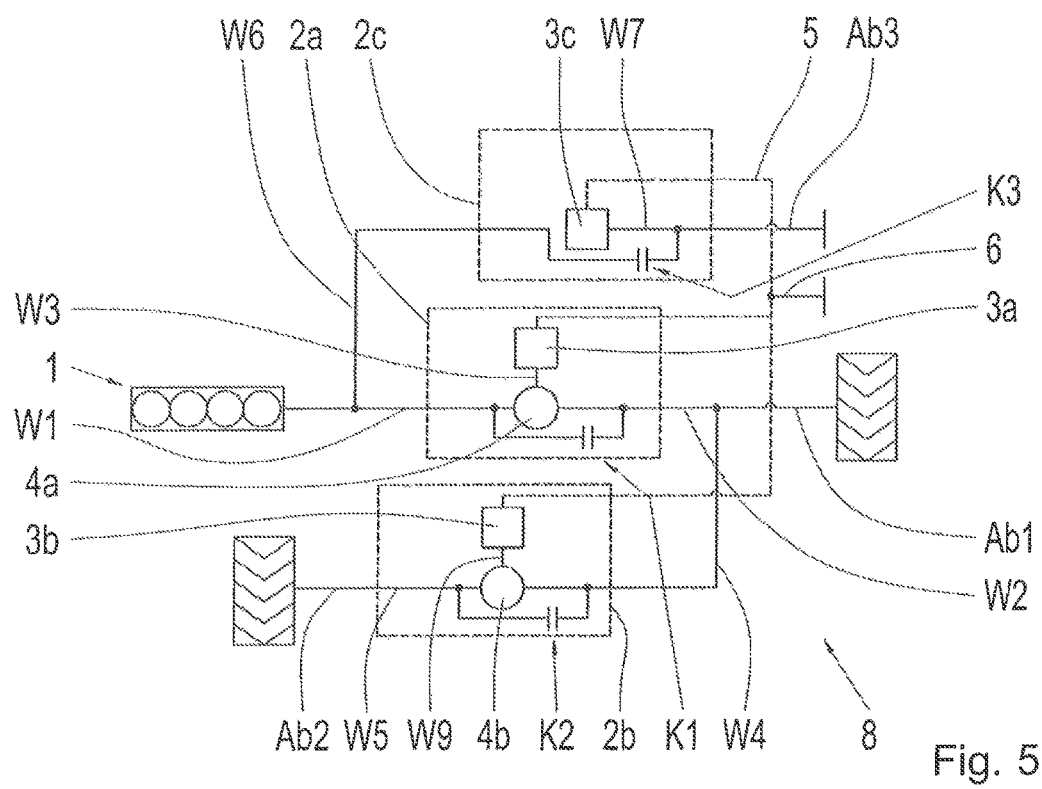

POWER-SPLIT DRIVELINE FOR A WORK MACHINE

This application claims priority from German patent application serial no. 10 2016 206 205.0 filed Apr. 13, 2016.

FIELD OF THE INVENTION

The invention relates to a power-split drive train for a working machine.

BACKGROUND OF THE INVENTION

Working machines, in particular agricultural machines, are increasingly constructed with continuously variable power-split transmissions. By virtue of using a continuously variable power-split transmission in combination with an appropriate driving strategy the efficiency, comfort and fuel consumption of working machines can be optimized. Furthermore, automatic continuous adjustment of the transmission gear ratio enables the driver or operator of a working machine to concentrate more fully on the working process to be carried out by the machine, so that working processes can be implemented efficiently and in each case with higher productivity along with good process quality.

DE 10 2013 224 383 A1 describes a power-split axle drive for a vehicle. The power-split axle drive comprises a main drive element, a first additional drive element, a second additional drive element, a first vehicle axle, a second vehicle axle and a main transmission. Rotational movement or torque that can be produced by the main drive element can be introduced by way of a first shaft into the main transmission and/or the first additional drive element and by virtue of the rotational movement or torque of the main drive element at least the first vehicle axle can be driven by the main transmission. The power-split axle drive comprises a power-split transmission which is connected, via a second shaft, to the first vehicle axle and the main transmission, via a third shaft to the second additional drive element, and via a fourth shaft to the second vehicle axle. The second additional drive element acts upon the power-split transmission, whereby an offset of the second vehicle axle can be regulated.

SUMMARY OF THE INVENTION

The purpose of the present invention is to develop further a power-split drive train for a working machine, which is in particular of simple design and has a compact structure.

This objective is achieved by the object described below with reference to the preferred embodiments.

The power-split drive train according to the invention for a working machine comprises a main drive element, first, second and third rotational-speed-variable drive output shafts and a continuously variable power-split transmission with first, second and third additional drive units, the transmission being designed to enable rotational speed variability at the three drive output shafts, wherein moreover each of the three additional drive units comprises an energy converter, the energy converters being connected and in particular functionally connected to one another by an electric line, wherein at least the first additional drive unit, in addition to the energy converter, also comprises a planetary gearset, wherein the main drive element is connected by a first shaft to the planetary gearset of the first additional drive unit, wherein the first drive output shaft is connected by a second shaft to the planetary gearset of the first additional drive unit and wherein the energy converter of the first additional drive unit is connected by a third shaft to the first planetary gearset of the first additional drive unit, wherein moreover the first additional drive unit is connected at least indirectly to the second additional drive unit and wherein the second additional drive unit is connected by a fifth shaft to the second drive output shaft, whereas in addition the first additional drive unit is connected at least indirectly to the third additional drive unit and the third additional drive unit is connected by a seventh shaft to the third drive output shaft.

In this context 'functionally connected' is understood to mean that the two elements can be connected directly to one another or that between two elements there are further elements, for example one or more spur gear stages.

In this context, 'power-split' is understood to mean that input power is divided along more than one power branch. An indirect connection between the additional drive elements in understood to mean that the respective additional drive units are not connected to one another directly, i.e. immediately, but by way of transmission elements, in particular shafts, gearwheels or shifting elements. A connection between two transmission elements is made essentially in order to transmit torque and rotational movement from one transmission element to the other transmission element. Furthermore, an indirect connection between the additional drive units can also be formed via an energy-carrying line, in particular a hydraulic or electric line between the energy converters. Two shafts are preferably connected to one another by way of a spur gear pair.

The main drive element is preferably an internal combustion engine, for example a motor powered by gas, gasoline or diesel fuel. Alternatively however, the main drive element can also be in the form of an electric machine or a combination of an internal combustion engine of any type and an electric machine.

In a preferred example embodiment the additional drive unit comprises an energy converter, in particular an electric machine. According to a further preferred example embodiment the additional drive unit is designed as a CVU (Continuously Variable Unit) and comprises an energy converter with an electric line and a planetary gearset with three shafts.

The first and second drive output shafts are vehicle axles of the working machine, which can be designed to be driven. Moreover, both the first drive output shaft and/or the second vehicle axle can be designed so as to be steerable. In particular, the first drive output shaft is designed as the rear axle and the second drive output shaft as the front axle. The third drive output shaft is designed to be an auxiliary drive output shaft and is designed in order to provide torque for the powering of working equipment or attachments. The second shaft and the first drive output shaft and the fifth shaft and the second drive output shaft, but also the seventh shaft and the third drive output shaft are connected rotationally fixed to one another, preferably integrally.

In what follows, a shaft is not to be understood exclusively as, for example, a cylindrical transmission element mounted to rotate, provided for the transmission of torques and rotational speeds, but is rather understood to include connecting elements in general which connect individual components or elements to one another. In particular, a shaft of a planetary transmission is in the form of the sun gear, the ring gear or the carrier.

In a preferred embodiment, the first additional drive unit is connected by way of the second shaft and a fourth shaft to the second additional drive unit, whereas the fifth shaft is connected to the energy converter of the second additional drive unit and can be coupled by means of a shifting element of the second additional drive unit to the fourth shaft. The first additional drive unit is connected by way of the first shaft and a sixth shaft to the third additional drive unit, and the energy converter of the third additional drive unit is connected by an eighth shaft to the planetary gearset of the third additional drive unit. The sixth shaft is connected to the planetary gearset of the third additional drive unit, the third drive output shaft is connected by a seventh shaft to the planetary gearset of the third additional drive unit, and the sixth shaft can be coupled to the seventh shaft by means of a first shifting element of the third additional drive unit. For further information about the arrangement and function of the respective shifting elements and transmission elements of the continuous power-split transmission, reference should be made to FIGS. 1 and 3, and to the associated figure descriptions.

According to a further preferred embodiment, the first additional drive unit is connected by way of the second shaft and a fourth shaft to the second additional drive unit, the second additional drive unit has a planetary gearset in addition to the energy converter, and the energy converter of the second additional drive unit is connected by a ninth shaft to the planetary gearset of the second additional drive unit. The fourth shaft is connected to the planetary gearset of the second additional drive unit, the second drive output shaft is connected by the fifth shaft to the planetary gearset of the second additional drive unit and the fourth shaft can be coupled to the fifth shaft by means of a shifting element of the second additional drive unit. The first additional drive unit is connected to the third additional drive unit by the first shaft and a sixth shaft. In addition to the energy converter the third additional drive unit comprises a planetary gearset and the energy converter of the third additional drive unit is connected to the planetary gearset of the third additional drive unit by an eighth shaft. The sixth shaft is connected to the planetary gearset of the third additional drive unit and the third drive output shaft is connected to the planetary gearset of the third additional drive unit by a seventh shaft. The sixth shaft can be coupled by means of a first shifting element of the third additional drive unit to the seventh shaft. For further information about the arrangement and function of the respective shifting elements and transmission elements of the continuous power-split transmission, reference should be made to FIGS. 2 and 3, and to the associated figure descriptions.

In another preferred embodiment, the first additional drive unit is connected by the second shaft and a fourth shaft to the second additional drive unit. The fifth shaft is connected to the energy converter of the second additional drive unit and can be coupled to the fourth shaft by means of a shifting element of the second additional drive unit. The first additional drive unit is connected to the third additional drive unit by the first shaft and a sixth shaft. The seventh shaft is connected to the energy converter of the third additional drive unit and can be coupled to the sixth shaft by means of a first coupling element of the third additional drive unit. For further information about the arrangement and function of the respective shifting elements and transmission elements of the continuous power-split transmission, reference should be made to FIGS. 4 and 6, and to the associated figure descriptions.

In a further preferred embodiment, the first additional drive unit is connected by the second shaft and a fourth shaft to the second additional drive unit. In addition to the energy converter the second additional drive unit also comprises a planetary gearset and the energy converter of the second additional drive unit is connected by a ninth shaft to the planetary gearset of the second additional drive unit. The fourth shaft is connected to the planetary gearset of the second additional drive unit, the second drive output shaft is connected by the fifth shaft to the planetary gearset of the second additional drive unit, and the fourth shaft can be coupled to the fifth shaft by means of a shifting element of the second additional drive unit. Furthermore, the first additional drive unit is connected to the third additional drive unit by way of the first shaft and a sixth shaft and the seventh shaft is connected to the energy converter of the third additional drive unit and can be coupled to the sixth shaft by means of a first shifting element of the third additional drive unit. For further information about the arrangement and function of the respective shifting elements and transmission elements of the continuous power-split transmission, reference should be made to FIGS. 5 and 6, and to the associated figure descriptions.

Preferably, the first shaft and the second shaft can be coupled to one another by means of a shifting element of the first additional drive unit. A shifting element is understood to be a device with at least an open and a closed condition, such that in the open condition the device can transmit no torque and in the closed condition the device can transmit torque between two devices that cooperate with the device or shifting element. The shifting element concerned can in particular be designed both as a powershift shifting element, particularly a friction clutch, and also as an interlocking shifting element, in particular a claw clutch.

Preferably, the seventh shaft can be held fixed relative to a housing by means of a second shifting element of the third additional drive unit. Thus, the second shifting element of the third additional drive unit is in the form of a brake. A brake is preferably understood to be a frictional shifting element connected on one side to a static element, namely the housing, and on another side to a rotating element, namely the seventh shaft. As a rule an actuator applies a force at the connection point, producing a frictional force by which, for example, rotational movement of the rotating component relative to the static component is buttressed so that the rotational movement is impeded or prevented. The actuator for actuating the shifting element can be operated hydraulically, electromechanically, electromagnetically, or, for example, even pneumatically.

Also preferably, the energy converters are designed to be operated electrically so that the electric line has an interface for the delivery and/or uptake of electric power. In particular the line is designed to conduct electrical energy between the energy converters. Preferably the interface is connected to an energy source and enables electrical energy to be supplied directly to the energy converter concerned. In particular the interface is connected to a mains network by way of which it can deliver and take up electrical energy.

Preferably, moreover, the electric line is connected at least indirectly to an energy storage device. 'Indirectly' means that some further, preferably electrical element can be arranged between the line and the energy storage device. However, it is also conceivable to connect the energy storage device directly to the line. The energy storage device is preferably in the form of an accumulator and is designed to store the electrical energy generated by the energy converters, or to deliver stored electrical energy to the energy converters or to other consumers. The power balance of the energy converters must not be equalized.

BRIEF DESCRIPTION OF THE DRAWINGS

Below, four example embodiments of the invention are explained in more detail with reference to the six drawings, which show:

FIG. 5: A schematic representation of a fourth embodiment of a power-split drive train according to the invention, and FIG. 6: A shifting matrix for the power-split drive trains according to FIGS. 4 and 5.

DETAILED DESCRIPTION OF THE PREFERRED EMBODIMENTS

Figure 1:
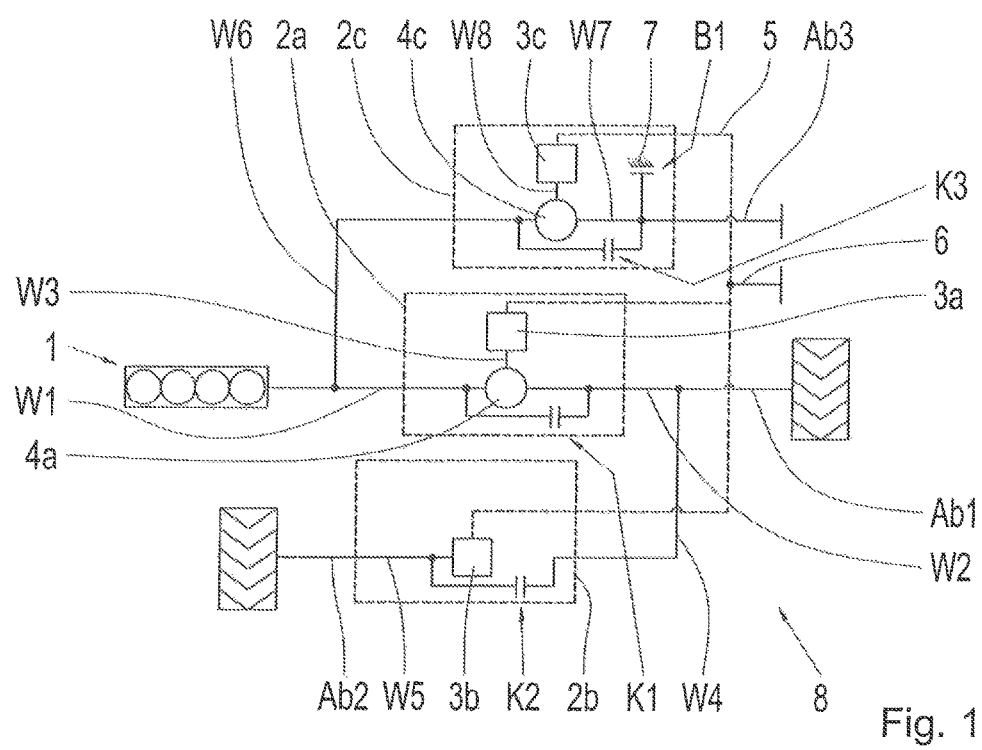
FIG. 1: A schematic representation of a first embodiment of a power-split drive train according to the invention.

As shown in FIGS. 1, 2, 4 and 5, a power-split drive train according to the invention for a working machine—not shown here—comprises a main drive element 1 and a continuously variable power-split transmission 8 with first, second and third additional drive units 2a, 2b, 2c, wherein the continuously variable power-split transmission 8 is designed to enable rotational speed variability at first, second and third drive output shafts Ab1, Ab2 and Ab3. Each of the three additional drive units 2a, 2b, 2c has an energy converter 3a, 3b, 3c and the energy converters 3a, 3b, 3c are functionally connected with one another by way of an electric line 5 and can be controlled by a respective control device—not shown here. In this case the main drive element 1 is an internal combustion engine, preferably a diesel engine. The first drive output shaft Ab1 is a rear axle, the second drive output shaft Ab2 is a front axle and the third drive output shaft Ab3 is an auxiliary power take-off shaft. By means of the third drive output shaft Ab3, in particular torque and rotational movement can be provided, preferably for powering working equipment or attachments.

The first additional drive unit 2a comprises the energy converter and a planetary gearset 4a with a first, second and third shaft W1, W2, W3, and is designed as a CVU. In the present case all the energy converters 3a, 3b, 3c are electric machines and the electric line 5 is designed to carry electrical energy. Moreover, in the line 5 there is formed an interface 6 which enables electrical energy to be fed into the line 5 and thus supplied to the energy converters 3a, 3b, 3c. In particular the interface 6 is connected to a mains terminal not shown here so that the energy converters 3a, 3b, 3c can be supplied from the mains terminal with electrical energy, while excess energy can be fed back into the mains terminal.

The main drive element 1 is connected by the first shaft W1 to the planetary gearset 4a of the first additional drive unit 2a. Furthermore, the first drive output shaft Ab1 is connected by the second shaft W2 to the planetary gearset 4a of the first additional drive unit 2a. The energy converter 3a of the first additional drive unit 2a is connected by the third shaft W3 to the planetary gearset 4a of the first additional drive unit 2a. In addition the first shaft W1 can be coupled to the second shaft W2 by means of a shifting element K1 of the first additional drive unit 2a. The shifting element K1 of the first additional drive unit 2a couples any two shafts W1, W2, W3 of the planetary gearset 4a of the first additional drive unit 2a to one another, in particular a sun gear and a carrier, a carrier and a ring gear, or a sun gear and a ring gear. An essential feature is the block circulation produced by the coupling of any two of the shafts W1, W2, W3 of the planetary gearset 4a of the first additional drive unit 2a. The block circulation is produced by coupling a driven shaft of the planetary gearset 4a of the first additional drive unit 2a, for example the sun gear, to a second shaft of the planetary gearset 4a of the first additional drive unit 2a, for example the ring gear. This compels the third shaft of the planetary gearset 4a of the first additional drive unit 2a, for example the carrier, to rotate at the same speed.

As shown in FIG. 1 the second shaft W2 and the first drive output shaft Ab1 are connected to the fourth shaft W4. By way of the second shaft W2 and the fourth shaft W4 the first additional drive unit 2a is connected to the second additional drive unit 2b. The second additional drive unit 2b comprises an energy converter 3b which is connected by a fifth shaft W5 to the second drive output shaft Ab2 and which can be coupled to the fourth shaft W4 by means of a shifting element K2 of the second additional drive unit 2b. In addition the first additional drive unit 2a is connected to the third additional drive unit 2c by the first shaft W1 and a sixth shaft W6. The third additional drive unit 2c has an energy converter 3c of the third additional drive unit 2c and a planetary gearset 4c of the third additional drive unit 2c, and is designed as a CVU. The energy converter 3c of the third additional drive unit 2c is connected by an eighth shaft W8 to the planetary gearset 4c of the third additional drive unit 2c. Furthermore, the third drive output shaft Ab3 is connected to the planetary gearset 4c of the third additional drive unit 2c by a seventh shaft W7. In addition the sixth shaft W6 can be coupled to the seventh shaft W7 by means of a first shifting element K3 of the third additional drive unit 2c, whereas the seventh shaft W7 can be held fixed relative to a housing 7 by means of a second shifting element B1 of the third additional drive unit 2c in the form of a brake.

Figures 2, 3:
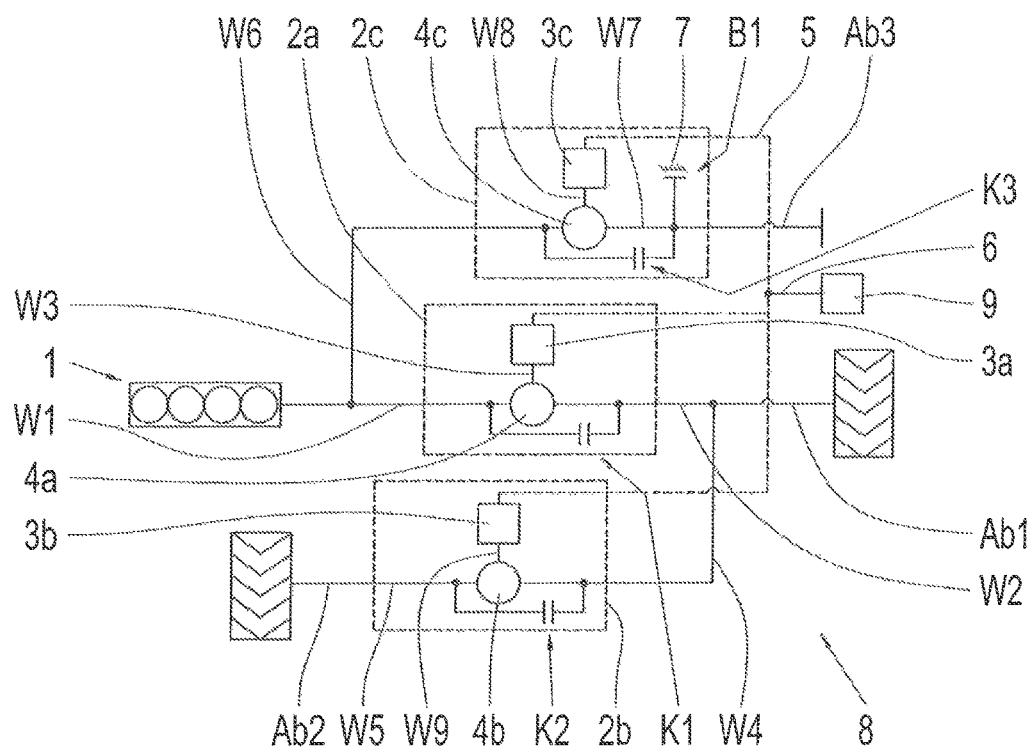
FIG. 2: A schematic representation of a second embodiment of a power-split drive train according to the invention.
FIG. 3: A shifting matrix for the power-split drive trains according to FIGS. 1 and 2, FIG. 4: A schematic representation of a third embodiment of a power-split drive train according to the invention.

FIG. 2 shows a schematic representation of a second embodiment of the power-split drive train. This differs from the embodiment shown in FIG. 1, in that the second additional drive unit 2b is designed as a CVU. Thus, like the first and third additional drive units 2a and 2c the second additional drive unit 2b too comprises an energy converter 3b and a planetary gearset 4b. The energy converter 3b of the second additional drive unit 2b is connected to the planetary gearset 4b of the second additional drive unit 2b by a ninth shaft W9. Moreover, the second drive output shaft Ab2 is connected to the planetary gearset 4b of the second additional drive unit 2b by the fifth shaft W5. In addition the fourth shaft W4 is connected to the planetary gearset 4b of the second additional drive unit 2b, and can be coupled to the fifth shaft W5 by means of the shifting element K2 of the second additional drive unit 2b. Furthermore, by way of the electric interface 6 an energy storage device 9 is connected to the electric line 5 and thus to the respective energy converters 3a, 3b, 3c. In other respects the embodiment shown in FIG. 2 corresponds to the embodiment described in FIG. 1.

FIG. 3 shows a shifting matrix for the two power-split drive trains according to the invention according to FIGS. 1 and 2. Vertically downward are shown eleven different shifting conditions S1 to S11. Horizontally to the right are shown the respective shifting elements K1, K2, K3 and B1. Cells left empty in the shifting matrix indicate that the corresponding shifting element K1, K2, K3 or B1 is open, i.e., that in those cases the shifting element K1, K2, K3, B1 does not transmit any force or torque. A cell containing a cross in the shifting matrix indicates that the corresponding shifting element K1, K2, K3, B1 is actuated or closed.

To form any CVT structure (CVT=Continuously Variable Transmission) at least two energy converters 3a, 3b, 3c have to interact synergistically. Thus, at least two energy converters 3a, 3b, 3c form a variator by which the CVT structure is formed. In this, at least one of the energy converters 3a, 3b, 3c is designed to act as a motor and the at least one other energy converter is designed to act as a generator.

Below, three different CVT structures are explained for the first drive output shaft Ab1. An 'input-coupled' CVT structure for the first drive output shaft Ab1 is understood to mean that on its input side the first additional drive unit 2a has a fixed rotational speed ratio. Thus, the energy converter 3a of the first additional drive unit 2a is connected in a rotationally fixed manner to the main drive element 1. An 'output-coupled' CVT structure for the first drive output shaft Ab1 is understood to mean that the first additional drive unit 2a has a fixed rotational speed ratio on its output side. Thus, the energy converter 3a of the first additional drive unit 2a is connected in rotationally fixed manner to the first drive output shaft Ab1. An 'input-output-coupled' CVT structure for the first drive output shaft Ab1 is understood to mean that the first additional drive unit 2a has a fixed rotational speed ratio on both the input and the output sides. Thus, the energy converter 3a of the first additional drive unit 2a is connected in a rotationally fixed manner both to the main drive element 1 and to the first drive output shaft Ab1. By means of the three energy converters 3a, 3b, 3c, operation is possible exclusively with the input-coupled CVT structure, or exclusively with the output-coupled CVT structure, or in a mixed operating mode between the input-coupled CVT structure and the output-coupled CVT structure.

To obtain the first shifting condition S1 in the power-split drive train, the shifting element K3 is closed and the three shifting elements K1, K2 and B1 are open. For the first drive output shaft Ab1 this produces the input-coupled CVT structure. Thus, rotational speed variability is obtained for the first and second drive output shafts Ab1, Ab2.

To obtain the second shifting condition S2 in the power-split drive train, the two shifting elements K2 and K3 are closed and the two shifting elements K1 and B1 are open. For the first drive output shaft Ab1 this produces the input-coupled CVT structure, the output-coupled CVT structure and the input-output-coupled CVT structure. Rotational speed variability is thus obtained for the first drive output shaft Ab1.

To obtain the third shifting condition S3 in the power-split drive train, the shifting element B1 is closed and the three shifting elements K1, K2 and K3 are open. For the first drive output shaft Ab1 this produces an input-coupled CVT structure. Thus, rotational speed variability is obtained for the first and second drive output shafts Ab1, Ab2. Moreover, the third drive output shaft Ab3 is held fixed.

To obtain the fourth shifting condition S4 in the power-split drive train, the two shifting elements K2 and B1 are closed and the two shifting elements K1 and K3 are open. For the first drive output shaft Ab1 this produces the input-coupled CVT structure, the output-coupled CVT structure and the input-output-coupled CVT structure. Thus, rotational speed variability is obtained for the first drive output shaft Ab1. Moreover, the third drive output shaft Ab3 is held fixed.

To obtain the fifth shifting condition S5 in the power-split drive train, the shifting element K2 is closed and the three shifting elements K1, K3 and B1 are open. For the first drive output Ab1 this produces an output-coupled CVT structure. Thus, rotational speed variability is obtained for the first and third drive output shafts Ab1, Ab3.

To obtain the sixth shifting condition S6 in the power-split drive train, the two shifting elements K1 and K3 are closed and the two shifting elements K2 and B1 are open. Rotational speed variability is obtained only for the second drive output shaft Ab2.

To obtain the seventh shifting condition S7 in the power-split drive train, the shifting element B1 is open and the three shifting elements K1, K2, K3 are closed. In this seventh shifting condition S7 none of the three drive output shafts Ab1, Ab2, Ab3 has rotational speed variability.

To obtain the eighth shifting condition S8 in the power-split drive train, the two shifting element K1 and B1 are closed and the two shifting elements K2 and K3 are open. For the second drive output shaft Ab2 this produces rotational speed variability. Moreover, the third drive output shaft Ab3 is held fixed.

To obtain the ninth shifting condition S9 in the power-split drive train, the shifting element K3 is open and the three shifting elements K1, K2 and B1 are closed. In this ninth shifting condition S9 none of the three drive output shafts Ab1, Ab2, Ab3 has rotational speed variability. Moreover, the third drive output shaft Ab3 is held fixed.

To obtain the tenth shifting condition S10 in the power-split drive train, the two shifting elements K1 and K2 are closed and the two shifting elements K3 and B1 are open. This produces rotational speed variability for the third drive output shaft Ab3.

To obtain the eleventh shifting condition S11 in the power-split drive train, the shifting element K1 is closed and the three shifting elements K2, K3 and B1 are open. This produces rotational speed variability for the second and third drive output shafts Ab2 and Ab3.

Figure 4:
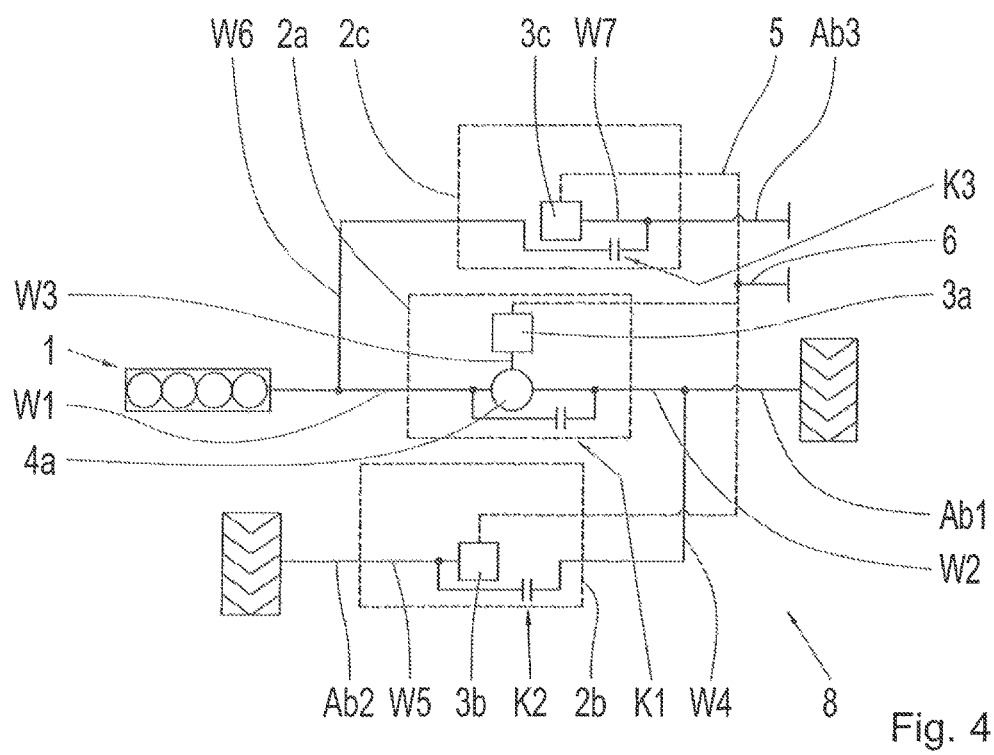

FIG. 4 shows a schematic representation of a third embodiment of the power-split drive train 1. This differs from the embodiment shown in FIG. 1, in that the third additional drive unit 2c is not designed as a CVU and does not therefore have a planetary gearset 4c. Thus, like the second additional drive unit 2b the third additional drive unit 2c only comprises the energy converter 3c of the third additional drive unit 2c. The first additional drive unit 2a is connected to the third additional drive unit 2c by way of the sixth shaft W6. The energy converter 3c of the third additional drive unit 2c is connected by the seventh shaft W7 to the third drive output shaft Ab3 and can be coupled to the sixth shaft W6 by means of first shifting element K3 of the third additional drive unit 2c. In addition the energy converter 3c of the third additional drive unit 2c is connected by way of the electric line 5 to the respective energy converter 3a and 3b of the first and second additional drive unit 2a, 2b. In other respects the embodiment shown in FIG. 4 corresponds to the embodiment described in FIG. 1.

FIG. 5 shows a schematic representation of a fourth embodiment of the power-split drive train 1. This differs from the embodiment shown in FIG. 1, in that the second additional drive unit 2b is designed as a CVU and the third additional drive unit 2c has no planetary gearset 4c and is therefore not designed as a CVU. Thus, the second additional drive unit 2b comprises an energy converter 3b and a planetary gearset 4b. The energy converter 3b of the second additional drive unit 2b is connected by a ninth shaft W9 to the planetary gearset 4b of the second additional drive unit 2b. In addition the second drive output shaft Ab2 is connected by the fifth shaft W5 to the planetary gearset 4b of the second additional drive unit 2b. Furthermore, the fourth shaft W4 is connected to the planetary gearset 4b of the second additional drive unit 2b and can be coupled to the fifth shaft W5 by means of the shifting element K2 of the second additional drive unit 2b. On the other hand the third additional drive unit 2c has no planetary gearset 4c but only the energy converter 3c. The first additional drive unit 2a is connected to the third additional drive unit 2c by the sixth shaft W6. The energy converter 3c of the third additional drive unit 2c is connected by the seventh shaft W7 to the drive output shaft Ab3 and can be coupled by means of the first shifting element K3 of the third additional drive unit 2c to the sixth shaft W6. In addition the energy converter 3c of the third additional drive unit 2c is connected by way of the electric line 5 to the respective energy converter 3a and 3b of the first and second additional drive unit 2a, 2b. In other respects the embodiment shown in FIG. 5 corresponds to the embodiment described in FIG. 1.

FIG. 6 shows a shifting matrix for the two power-split drive trains according to the invention shown in FIGS. 4 and 5. Vertically downward seven different shifting conditions S1 to S7 are shown. Horizontally to the right are shown the respective shifting elements K1, K2 and K3. The empty cells in the shifting matrix indicate that the corresponding shifting element K1, K2 and K3 is open, i.e. that in those cases the corresponding shifting element K1, K2 and K3 does not transmit any force or torque. A cell containing a cross indicates that the corresponding shifting element K1, K2 or K3 is actuated or closed.

To obtain the first shifting condition S1 in the power-split drive train, the shifting element K3 is closed and the two shifting elements K1 and K2 are open. This produces an input-coupled CVT structure for the first drive output shaft Ab1. Thus, rotational speed variability is obtained for the first and second drive output shafts Ab1, Ab2.

To obtain the second shifting condition S2 in the power-split drive train, the two shifting elements K2 and K3 are closed and the shifting element K1 is open. For the first drive output shaft Ab1 this produces an input-coupled additional drive unit structure, an output-coupled CVT structure and an input-output-coupled CVT structure. Thus, rotational speed variability is obtained for the first drive output shaft Ab1.

To obtain the third shifting condition S3 in the power-split drive train, the shifting element K2 is closed and the two shifting elements K1 and K3 are open. For the first drive output shaft Ab1 this produces an output-coupled CVT structure. Thus, rotational speed variability is obtained for the first and third drive output shafts Ab1, Ab3.

To obtain the fourth shifting condition S4 in the power-split drive train, the two shifting elements K1 and K3 are closed and the shifting element K2 is open. This produces rotational speed variability for the second drive output shaft Ab2.

To obtain the fifth shifting condition S5 in the power-split drive train, all three of the shifting elements K1, K2 and K3 are closed. In the fifth shifting condition none of the three drive output shafts Ab1, Ab2 and Ab3 has rotational speed variability.

To obtain the sixth shifting condition S6 in the power-split drive train, the two shifting elements K1 and K2 are closed and the shifting element K3 is open. Rotational speed variability is only obtained for the third drive output shaft Ab3.

To obtain the seventh shifting condition S7 in the power-split drive train, the shifting element K1 is closed and the two shifting elements K2 and K3 are opened. Thus, rotational speed variability is obtained for the second and third drive output shafts Ab2 and Ab3.

The four embodiments of the power-split drive train according to the invention illustrated can be simplified, in particular by the omission of shifting elements and the associated omission of shifting conditions. For example, the first additional drive unit 2a shown in FIGS. 1, 2, 4 and 5 can have no shifting element K1, so that the first and second shafts W1 and W2 cannot be coupled to one another. Then, all the shifting conditions in which the shifting element K1 is closed are unavailable.

Alternatively, the shifting element K1 of the first additional drive unit 2a in FIG. 1 can be arranged between the second shaft W2 and the third shaft W3. Inasmuch as the shifting elements K1, K2, K3 are connected to respective planetary gearsets 4a, 4b, 4c, coupling with two of the three shafts of the planetary gearset 4a, 4b, 4c concerned is possible.

In the present case the control units for controlling and regulating the energy converters 3a, 3b, 3c are not shown in the figures. In further developments of the embodiments according to the invention, further shiftable and/or non-shiftable transmission stages can be arranged upstream and/or downstream.

Preferably, the second additional drive unit 2b in FIGS. 1 and 4 comprises the shifting element K2. Further, however, it is also conceivable to omit the shifting element K2 of the second additional drive unit 2b, and the fifth shaft W5 is then connected rotationally fixed to or made integrally with the fourth shaft W4. In that case all the shifting conditions in which K2 is open are unavailable. Furthermore, it is conceivable to omit the fourth shaft W4 and the energy converter 3b of the second additional drive unit 2b is then connected to the second drive output shaft Ab2 by the fifth shaft W5 and by the electric line 5 to the respective energy converter 3a and 3c of the first and third additional drive unit 2a, 2c. All shifting conditions in which K2 is closed are then unavailable.

Also preferably, the second additional drive unit 2b shown in FIGS. 2 and 5 comprises the shifting element K2. In addition, however, it is also conceivable to omit the shifting element K2 of the second additional drive unit 2b. In that case all shifting conditions in which the shifting element K2 is closed are unavailable.

Also preferably, the third additional drive unit 2c shown in FIGS. 1 and 2 comprises the first shifting element K3, whereas the second shifting element B1 of the third additional drive unit 2c is omitted. Thus, all the shifting conditions with the second shifting element B1 closed are unavailable. Preferably moreover, the third additional drive unit 2c comprises the second shifting element B1 whereas the first shifting element K3 of the third additional drive unit 2c is omitted. Then, all the shifting conditions with the first shifting element K3 closed are unavailable. The closing of the second shifting element B1 of the third additional drive unit 2c can in particular produce a preferred rotational speed level of the energy converter 3c of the third additional drive unit 2c, whereby a rotational speed is increased and torque is reduced.

Preferably also, the third additional drive unit 2c according to FIGS. 4 and 5 comprises the first shifting element K3. Further, however, it is also conceivable to omit the first shifting element K3 of the third additional drive unit 2c and the seventh shaft W7 is then connected rotationally fixed to or made integrally with the sixth shaft W6. In that case all shifting conditions with K3 open are unavailable. Furthermore, it is conceivable to omit the sixth shaft W6 and the energy converter 3c of the third additional drive unit 2c is then connected by the seventh shaft W7 to the third drive output shaft Ab3 and by the electric line 5 to the respective energy converter 3a and 3b of the first and second additional drive unit 2a, 2b. All the shifting conditions with K3 closed are then unavailable.

The example embodiments described enable various operating modes with fully or partially continuously variable drive for the respective drive output shafts Ab1, Ab2, Ab3. An advantage of the example embodiments shown is the very small number of energy converters 3a, 3b, 3c needed, which among other things makes it possible to produce a compactly built and cost-optimized power-split drive train. Owing to the multiple use and synergistic interplay of the three additional drive units 2a, 2b, 2c, depending on the shifting condition three rotation-speed-variable drive output shafts Ab1, Ab2, Ab3 are available.

INDEXES

1 Main drive element
2a First additional drive unit
2b Second additional drive unit
2c Third additional drive unit
3a Energy converter of the first additional drive unit
3b Energy converter of the second additional drive unit
3c Energy converter of the third additional drive unit
4a First planetary gearset of the first additional drive unit
4b Planetary gearset of the second additional drive unit
4c Planetary gearset of the third additional drive unit
5 Electric line
6 Interface
7 Housing
8 Continuous power-split transmission
9 Energy storage device
Ab1 First drive output shaft
Ab2 Second drive output shaft
Ab3 Third drive output shaft
K1 Shifting element of the first additional drive unit
K2 Shifting element of the second additional drive unit
K3 First shifting element of the third additional drive unit
B1 Second shifting element of the third additional drive unit
W1 First shaft
W2 Second shaft
W3 Third shaft
W4 Fourth shaft
W5 Fifth shaft
W6 Sixth shaft
W7 Seventh shaft
W8 Eighth shaft
W9 Ninth shaft
S1 First shifting condition
S2 Second shifting condition
S3 Third shifting condition
S4 Fourth shifting condition
S5 Fifth shifting condition
S6 Sixth shifting condition
S7 Seventh shifting condition
S8 Eighth shifting condition
S9 Ninth shifting condition
S10 Tenth shifting condition
S11 Eleventh shifting condition

The invention claimed is:

1. A power-split drive train for a working machine, the power-split drive train comprising:
a main drive element,
first, second and third rotational-speed-variable drive output shafts, and
a continuously variable power-split transmission having first, second and third additional drive units,
the transmission being designed to enable rotational speed variability at the first, the second and the third drive output shafts,
each of the first, the second, and the third additional drive units comprising an energy converter, and the energy converters being functionally connected to one another at least by an electric line,
the first additional drive unit, in addition to the energy converter, also comprising a planetary gearset,
the main drive element being connected by a first shaft to the planetary gearset of the first additional drive unit, and the first drive output shaft being connected by a second shaft to the planetary gearset of the first additional drive unit,
the energy converter of the first additional drive unit being connected by a third shaft to the planetary gearset of the first additional drive unit,
the first additional drive unit being at least indirectly connected to the second additional drive unit, and the second additional drive unit being connected by a fifth shaft to the second drive output shaft,
the first additional drive unit being at least indirectly connected to the third additional drive unit and the third additional drive unit being connected by a seventh shaft to the third drive output shaft.

2. The power-split drive train according to claim 1, wherein the first additional drive unit is connected by the second shaft and a fourth shaft to the second additional drive unit, the fifth shaft is connected to the energy converter of the second additional drive unit and is couplable by a shifting element of the second additional drive unit to the fourth shaft, and the first additional drive unit is connected by the first shaft and a sixth shaft to the third additional drive unit, the seventh shaft is connected to the energy converter of the third additional drive unit and is couplable, by a shifting element of the third additional drive unit, to the sixth shaft.

3. The power-split drive train according to claim 1, wherein the first shaft and the second shaft are couplable to one another by a shifting element of the first additional drive unit.

4. The power-split drive train according to claim 1, wherein the seventh shaft is rotationally fixable relative to a housing by a shifting element of the third additional drive unit.

5. The power-split drive train according to claim 1, wherein the electric line is at least indirectly connected to an energy storage device.

6. The power-split drive train according to claim 1, wherein the energy converters of the first, the second, and the third additional drive units are designed to be electrically operated, and the electric line comprises an interface for at least one of delivery and uptake of electric power.

7. A working machine comprising:
a power-split drive train for a working machine comprising:
a main drive element,
first, second and third rotational-speed-variable drive output shafts, and
a continuously variable power-split transmission having first, second and third additional drive units,
the transmission being designed to enable rotational speed variability at the first, the second and the third drive output shafts,
each of the first, the second, and the third additional drive units comprising an energy converter,
the energy converters being functionally connected to one another at least by an electric line,
the first additional drive unit, in addition to the energy converter, also comprising a planetary gearset, the main drive element being connected by a first shaft to the planetary gearset of the first additional drive unit, the first drive output shaft being connected by a second shaft to the planetary gearset of the first additional drive unit, and the energy converter of the first additional drive unit being connected by a third shaft to the planetary gearset of the first additional drive unit, the first additional drive unit being at least indirectly connected to the second additional drive unit, and the second additional drive unit is connected by a fifth shaft to the second drive output shaft, and the first additional drive unit being at least indirectly connected to the third additional drive unit, and the third additional drive unit being connected by a seventh shaft to the third drive output shaft.

8. A power-split drive train for a working machine comprising:

a main drive element;

first, second and third rotational-speed-variable drive output shafts;

a continuously variable powersplit transmission comprising first, second and third additional drive units, and the transmission being designed to enable rotational speed variability at the three drive output shafts, each of the first, the second and the third additional drive units comprises an energy converter, and the energy converters of the first, the second and the third additional drive units being functionally connected to one another by an electric line;

the first additional drive unit further comprises a planetary gearset, and the planetary gearset of the first additional drive unit being connected, via a first shaft, to the main drive element, and being connected, via a second shaft, to the first drive output shaft, and being connected, via a third shaft, to the energy converter of the first additional drive unit;

the first additional drive unit being at least indirectly connected to each of the second and the third additional drive units;

the second additional drive unit being connected, via a fifth shaft, to the second drive output shaft;

the first additional drive unit being at least indirectly connected to the third additional drive unit; and the third additional drive unit being connected, via a seventh shaft, to the third drive output shaft.

* * * * *